United States Patent
Zhang et al.

(10) Patent No.: US 8,098,952 B2
(45) Date of Patent: Jan. 17, 2012

(54) METHOD AND DEVICE FOR REMOVING IMAGE NOISE BASED ON THE MEDIAN FILTER

(75) Inventors: Benhao Zhang, Shanghai (CN); Xiaoguang Feng, Shanghai (CN); Jing Hu, Shanghai (CN); Fuhuei Lin, Cupertino, CA (US)

(73) Assignee: Spreadtrum Communications (Shangihai) Co., Ltd., Shanghai (CN)

( * ) Notice: Subject to any disclaimer, the term of this patent is extended or adjusted under 35 U.S.C. 154(b) by 109 days.

(21) Appl. No.: 12/615,923

(22) Filed: Nov. 10, 2009

(65) Prior Publication Data

US 2010/0098348 A1    Apr. 22, 2010

Related U.S. Application Data

(63) Continuation of application No. PCT/CN2008/071144, filed on May 30, 2008.

(30) Foreign Application Priority Data

May 30, 2007    (CN) .......................... 2007 1 0041443

(51) Int. Cl.
*G06K 9/40*    (2006.01)
*H03M 7/00*    (2006.01)
*G06K 9/00*    (2006.01)

(52) U.S. Cl. ........................................ 382/262; 341/107

(58) Field of Classification Search .................. 382/172, 382/218–220, 232, 233, 240, 254, 260–264; 341/107; 375/346

See application file for complete search history.

(56) References Cited

U.S. PATENT DOCUMENTS 6,229,578 B1    5/2001  Acharya et al.
7,260,266 B2 *  8/2007  Nakajima et al. ............. 382/240
7,271,749 B2 *  9/2007  Weissman et al. ............ 341/107
7,515,763 B1 *  4/2009  Zhong ........................... 382/254
2010/0098348 A1 * 4/2010 Zhang et al. ................ 382/262

FOREIGN PATENT DOCUMENTS

CN          1761286         4/2006
WO    WO 2007/020930       2/2007

* cited by examiner

*Primary Examiner* — Amir Alavi
(74) *Attorney, Agent, or Firm* — Dorsey & Whitney LLP

(57) ABSTRACT

A method and an apparatus for image denoising based on medium filter is disclosed according to the present invention. Such method and apparatus may be used to remove linear noise and random noise for the sensor, as well as the bad points in the sensor image, and to prevent over-denoising. The technical solutions includes selecting three groups of pixels from neighboring pixels of a current pixel, calculating medians $\Phi1$, $\Phi2$ and $\Phi3$ for the pixels in each group; calculating a reference luminance Y: $Y=\Phi2+[\Phi1+\Phi3-2*\Phi2]*h*[1-k*var]$, where $var=\Phi3-\Phi1$; determining whether the current pixel (cur_pixel) is a bad pixel; letting a temporary variable (tmp_data) be $\Phi1$ if the current pixel is a bad pixel; letting a temporary variable (tmp_data) be the current pixel value (cur_pixel) if the current pixel is not a bad pixel; determining whether the current pixel is located on an edge. If the current pixel is determined to be located on the edge, the reference luminance Y is limited to a range of [tmp_data−edge_limit, tmp_data+edge_limit], the current pixel value is updated with the limited reference luminance Y and the denoising process ends. If the current pixel is determined not to be located on the edge, the value of |Y−tmp_data| and the value of avoid_over_noise are compared. If |Y−tmp_data|<avoid_over_noise, the current pixel value is updated with Y; otherwise, the current pixel value is updated with tmp_data. The above steps for each pixel in the image is repeated. The present invention is applicable to image denoising field.

8 Claims, 3 Drawing Sheets

METHOD AND DEVICE FOR REMOVING IMAGE NOISE BASED ON THE MEDIAN FILTER

CROSS REFERENCE

This application is a continuation of International Application No. PCT/CN2008/071144, filed on May 30, 2008, which claims priority to Chinese Patent Application No. 200710041443.5, filed on May 30, 2007, both of which are hereby incorporated by reference in their entireties.

FIELD OF THE INVENTION

The present invention relates to image denoising, and more specifically, to a method and apparatus for image denoising applicable to Bayer image space or interpolated RGB image space.

BACKGROUND

Image denoising is an important process in ISP processing. There are a variety of image denoising methods. Currently, a majority of the image denoising methods based on median filter are very simple. FIG. 1 illustrates a conventional method for image denoising. For a current pixel, three groups of pixels are selected from its neighboring pixels using a certain approach. Medians $\Phi 1$, $\Phi 2$ and $\Phi 3$ for the three groups of pixels values are calculated, respectively. Denoising is then performed on the current pixel. Edge preserving is conducted if the current pixel is located on the edge.

The denoising effect of the above traditional denoising method is not satisfactory and new noise may be introduced sometimes. This is even more the case when a bad pixel exists in the image.

SUMMARY

The present invention is directed to a method and an apparatus for image denoising based on median filter. Such method and apparatus can be used to remove linear noise and a portion of random noise for the sensor, as well as the bad pixels in the sensor image, such that the over-denoising due to the denoising process can be prevented.

According to the technical solutions of the present invention, a method for image denoising based on median filter is provided. The method includes:

selecting three groups of pixels from neighboring pixels of a current pixel (cur_pixel), calculating medians $\Phi 1$, $\Phi 2$ and $\Phi 3$ for the three groups of pixels, respectively;

calculating a reference luminance Y as $Y=\Phi 2+[\Phi 1+\Phi 3-2*\Phi 2]*h*[1-k*var]$, where $var=\Phi 3-\Phi 1$ and h, k are two adjustable parameters for controlling denoising intensity;

determining whether the current pixel (cur_pixel) is a bad pixel, letting a temporary variable (tmp_data) be $\Phi 1$ if the current pixel is a bad pixel; otherwise, letting a temporary variable (tmp_data) be the current pixel value (cur_pixel);

determining whether the current pixel is located on an edge. If the current pixel is located on the edge, the reference luminance Y is limited to a range of [tmp_data−edge_limit, tmp_data+edge_limit] and the current pixel value (cur_pixel) is updated with the limited reference luminance Y, where edge_limit is a luminance adjusting parameter within a range of 0~255. The denoising process ends.

comparing |Y−tmp_data| and avoid_over_noise if the current pixel is not located on the edge, where avoid_over_noise is an adjustable parameter indicating a threshold of preventing over-denoising. If |Y−tmp_data|<avoid_over_noise, the current pixel value is updated with the reference luminance Y; otherwise, the current pixel value is updated with the temporary variable (tmp_data).

repeating the above steps for each pixel in the image.

In the above method for image denoising based on median filter, for any one of the groups of pixels selected from the neighboring pixels of the current pixel, the other pixels in the same group are distributed symmetrically along the current pixel.

In the method for image denoising based on median filter, the criteria for determining whether the current pixel is a bad pixel is to compare the value of |cur_pixel−$\Phi 1$| and the value of bad_pixel, where bad_pixel is a bad pixel detection parameter; and if |cur_pixel−$\Phi 1$|>bad_pixel, it is determined that the current pixel is a bad pixel; otherwise, it is determined that the current pixel is not a bad pixel.

In the above method for image denoising based on median filter, the criteria for determining whether the current pixel is located on the edge is to compare the value of max_d and the value of edge_par, where max_d is the larger one between a difference between values of two pixels which are spaced furthest apart in a horizontal direction among the pixels selected in the first step and a difference between values of two pixels which are spaced furthest apart in a vertical direction among the selected pixels, where edge_par is an adjustable parameter indicating an edge threshold. If max_d>edge_par, it is determined that the current pixel is located on the edge;otherwise, it is determined that the current pixel is not on the edge.

Based on the above method, an apparatus for image denoising based on median filter is also provided according to the present invention. The apparatus includes:

a pixel selecting module configured to select three groups of pixels from neighboring pixels of a current pixel (cur_pixel);

a median calculating module configured to calculate medians $\Phi 1$, $\Phi 2$ and $\Phi 3$ for the three groups of pixels, respectively, by virtue of the median filter;

a reference luminance calculating module configured to calculate a reference luminance Y: $Y=\Phi 2+[\Phi 1+\Phi 3-2*\Phi 2]*h*[1-k*var]$, where $var=\Phi 3-\Phi 1$ and h, k are two adjustable parameters for controlling denoising intensity;

a bad pixel processing module configured to determine whether the current pixel (cur_pixel) is a bad pixel. If the current pixel is a bad pixel, let a temporary variable be $\Phi 1$ (tmp_data=$\Phi 1$); otherwise, let a temporary variable be the current pixel value (tmp_data=cur_pixel);

an edge determining module configured to determine if the current pixel is located on the edge;

an edge processing module configured to perform edge preserving on the current pixel located on the edge and limit the reference luminance Y to a range of [tmp_data−edge_limit, tmp_data+edge_limit], where edge_limit is a luminance adjusting parameter within a range of 0~255 and the edge processing module is further configured to update the current pixel value with the reference luminance Y;

a non-edge processing module configured to perform a process for over-denoising on the current pixel, wherein if |Y−tmp_data|<avoid_over_noise, the current pixel v value is updated with the reference luminance Y; otherwise, the current pixel value is updated with tmp_data, where avoid_over_noise is an adjustable parameter indicating a threshold for preventing over-denoising.

In the pixel selecting module in above apparatus for image denoising based on median filter, for any one of the groups of pixels selected from the neighboring pixels of the current pixel, the other pixels in the same group are distributed symmetrically along the current pixel.

In the bad pixel processing module in the above apparatus for image denoising based on median filter, the criteria for determining whether the current pixel is a bad pixel is to compare the value of |cur_pixel−Φ1| and the value of bad_pixel, where bad_pixel is a bad pixel detection parameter; and if |cur_pixel−Φ1|>bad_pixel, it is determined that the current pixel is a bad pixel; otherwise, it is determined that the current pixel is not a bad pixel.

In the above apparatus for image denoising based on median filter, the criteria for the edge determining module to determine whether the current pixel is located on the edge is to compare the value of max_d and the value of edge_par, where max_d is the larger one between a difference between values of two pixels which are spaced furthest apart in a horizontal direction among the pixels selected by the pixel selecting module and a difference between values of two pixels which are spaced furthest apart in a vertical direction among the selected pixels, where edge_par is an adjustable parameter indicating an edge threshold. If max_d>edge_par, it is determined that the current pixel is located on the edge; otherwise, it is determined that the current pixel is not on the edge.

The present invention has the following benefits over the prior arts. In addition to the conventional image denoising process, the present invention provides a process for processing a bad pixel when the current pixel is determined to be a bad pixel and a process for preventing over-denoising on the current pixel which is not located on the edge. Therefore, compared with the prior art, the present invention is able to remove linear noise and a portion of random noise for the sensor, as well as the bad pixels in the sensor image and to prevent over-denoising caused during the denoising process.

PREFERRED EMBODIMENT OF THE PRESENT INVENTION

Detailed description will be made to the present invention in conjunction with the embodiments and the accompanying drawings.

Figure 1:
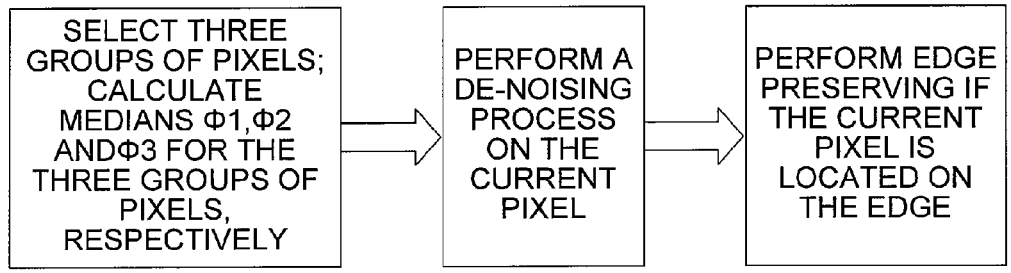
FIG. 1 is a flow diagram of a traditional image denoising process.
Figure 2:
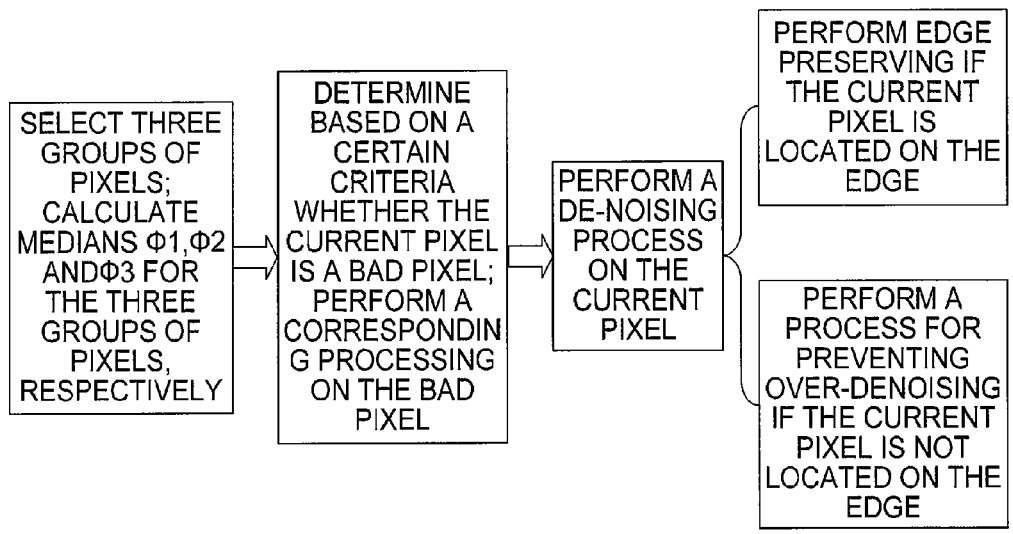
FIG. 2 is a flow diagram of a method for image denoising according to a preferred embodiment of the present invention.

FIG. 2 illustrates a schematic process of a method for image denoising according to the present invention. Referring to FIG. 2, three groups of pixels are selected initially from the neighboring pixels of the current pixel using a certain method. Medians Φ1, Φ2 and Φ3 for the three groups of pixels values are calculated respectively using a median filter. Then, it is determined based on a certain criteria whether the current pixel is a bad pixel. If it is a bad pixel, a corresponding processing step will be performed on the bad pixel. Lastly, a denoising process is performed on the current pixel. Edge preserving is conducted if the current pixel is located on the edge; otherwise, a process of preventing over-denoising is performed on the current pixel.

Figure 3:
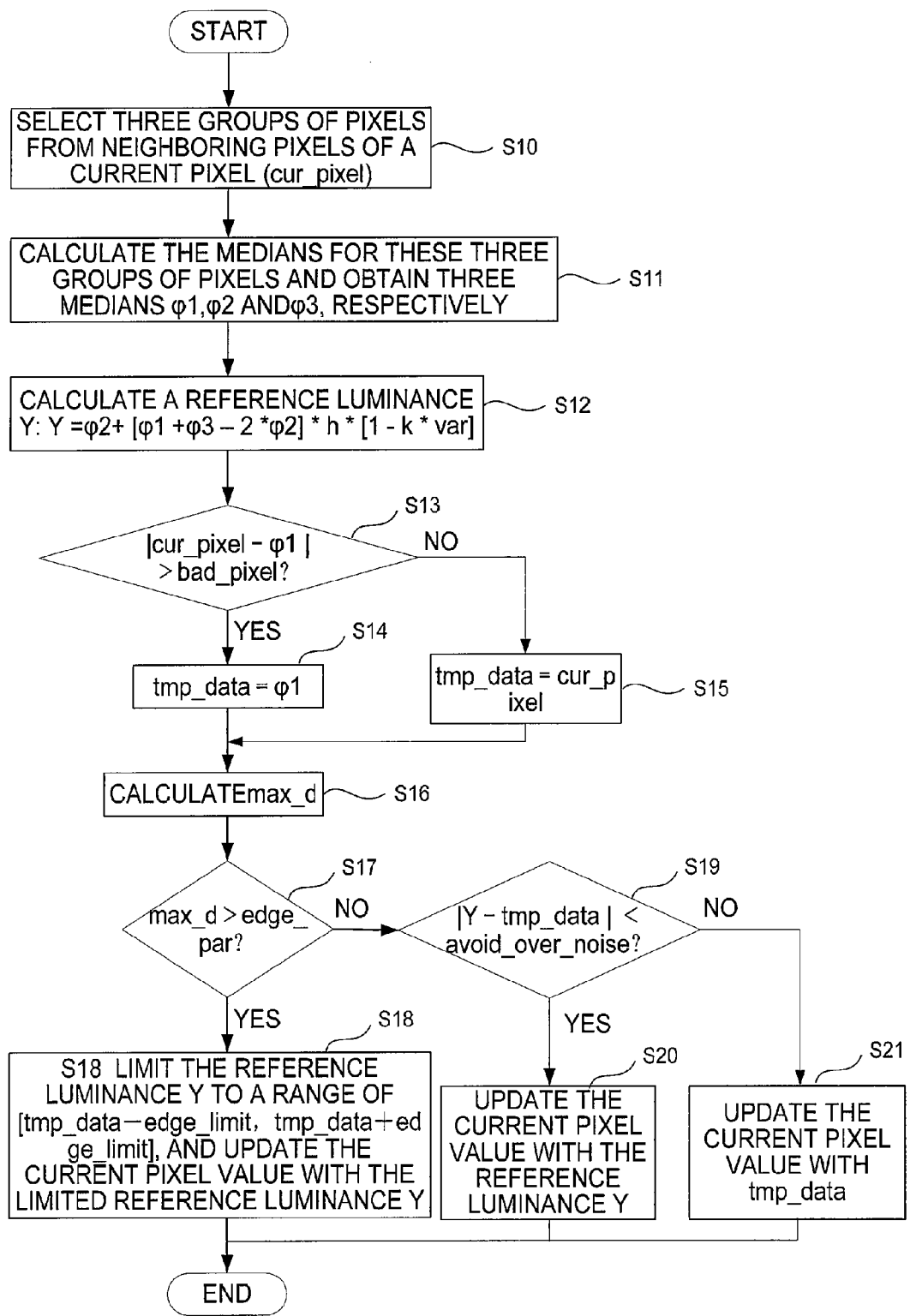
FIG. 3 is a more detailed flow diagram of a method for image denoising according to the present invention.

FIG. 3 illustrates a more detailed embodiment of FIG. 2. With reference to FIG. 2, a detailed description of each step in the process of extracting image noise is provided as follows.

The following step is described in an example of processing a current pixel (cur_pixel). A de-noised image can be obtained by repeating the following step on each pixel in the image.

At step S10, three groups of pixels are selected from neighboring pixels of a current pixel (cur_pixel).

Figure 4:
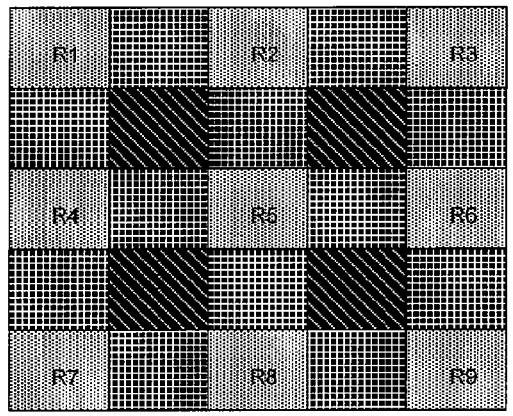
FIG. 4 is an illustration of an example of pixel selection.

FIG. 4 shows an example of pixel selection. Assume that the current pixel (cur_pixel) is R5 and three groups of pixels are to be selected from its neighboring 5×5 pixels. The pixels are selected in such a way that the first group is comprised of R1,R3,R7,R9,R5, the second group is comprised of R2,R4,R5,R6,R8, and the third group is comprised of R2,R4,R5,R5,R5,R6,R8.

The pixel selection method may be any one of the appropriate methods. In general, the pixel selection method follows the below rules. For each group of pixels selected from the neighboring pixels, the other pixels in the same group are distributed symmetrically along the current pixel. The method of selecting pixels and the number of the pixels to be selected may vary.

At step S11, the medians for these three groups of pixels are calculated respectively. That is, three medians Φ1, Φ2 and Φ3 are obtained by the median filter.

At step S12, reference luminance Y is calculated. The formula for calculation is Y=Φ2+[Φ1+Φ3−2*Φ2]*h*[1−k*var], where var=Φ3−Φ1 and h, k are two adjustable parameters for controlling denoising intensity.

At step S13, it is determined whether the current pixel (cur_pixel) is a bad pixel. If it is determined that the current pixel is a bad pixel, the process proceeds to step S14; otherwise, the process proceeds to step S15.

In the present embodiment, the determination on whether the pixel is a bad pixel is conducted by comparing the values of |cur_pixel−Φ1| and bad pixel detection parameter (bad_pixel). If |cur_pixel−Φ1|>bad_pixel, the current pixel (cur_pixel) is determined to be a bad pixel; otherwise, the current pixel (cur_pixel) is not a bad pixel.

At step S14, let a temporary variable (tmp_data) be Φ1, i.e., tmp_data=Φ1.

At step S15, let tmp_data=cur_pixel.

At step S16, the difference between values of two pixels which are spaced furthest apart in a horizontal direction among the selected pixels and the difference between values of two pixels which are spaced furthest apart in a vertical direction among the selected pixels are calculated. The two differences are then compared. The larger difference is denoted as "max_d".

In the example of FIG. 4, |R2-R8| and |R4-R6| are compared. The larger one is denoted as "max_d."

At step S17, it is determined whether the current pixel (cur_pixel) is located on the edge.

The criteria for determining whether the current pixel (cur_pixel) is located on the edge is to compare the values of max_d and edge_par where edge_par is an adjustable parameter indicating an edge threshold. If max_d>edge_par, the current pixel is determined to be located on the edge and the process goes to step S18; otherwise, the current pixel is determined not to be located on the edge and the process goes to step S19.

At step S18, the reference luminance Y is limited to a range of [tmp_data−edge_limit, tmp_data+edge_limit], where the luminance adjusting parameter (edge_limit) is within a range of 0~255. The current pixel (cur_pixel) is then updated with the limited reference luminance Y. The denoising process ends.

At step S19, the values of |Y−tmp_data| and avoid_over_noise are compared, where avoid_over_noise is an adjustable parameter indicating a threshold for preventing over-denoising. If |Y−tmp_data|<avoid_over_noise, the process goes to step S20; otherwise, the process goes to step S21.

At step S20, the current pixel (cur_pixel) is updated with the reference luminance Y. The denoising process ends.

At step S21, the current pixel (cur_pixel) is updated with tmp_data. The denoising process ends.

Figure 5:
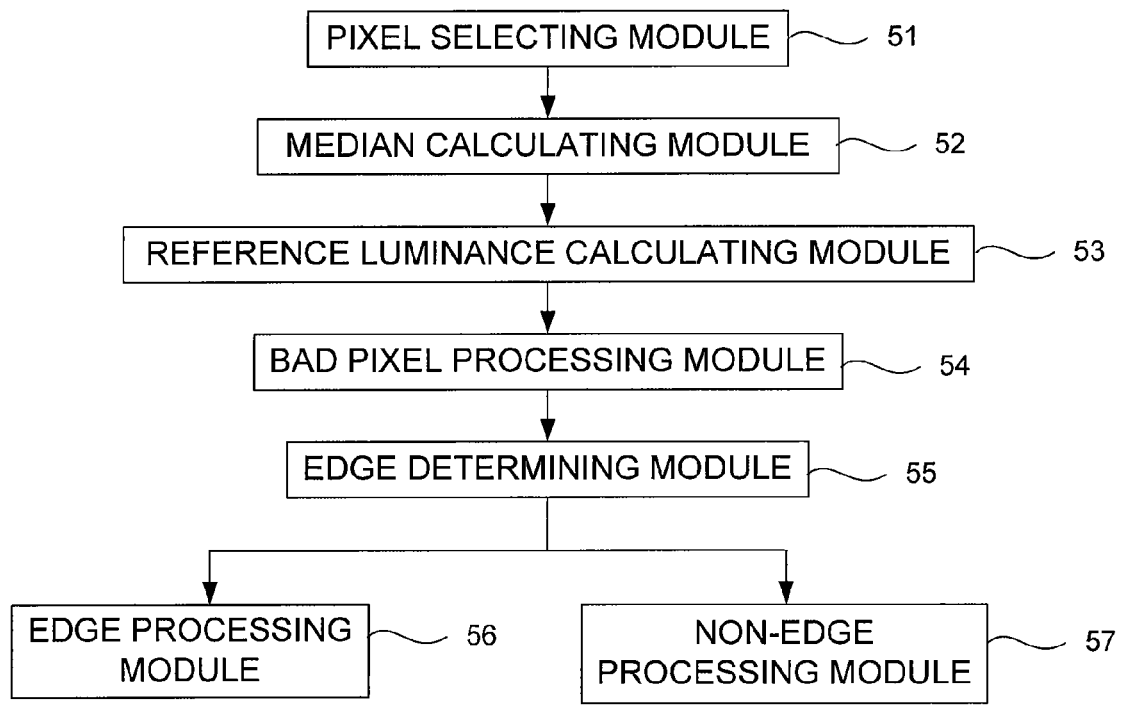
FIG. 5 is a block diagram of an apparatus for image denoising according to the present invention.

Based on the above method, an apparatus for image denoising based on median filter is also provided according to the present invention, as illustrated in FIG. 5. The apparatus includes a pixel selecting module 51, a median calculating module 52, a reference luminance calculating module 53, a bad pixel processing module 54, an edge determining module 55, an edge processing module 56, a non-edge processing module 57.

The pixel selecting module 51 selects three combinations of pixels from the neighboring pixels of the current pixel (cur_pixel). The pixel selection method may be any one of the appropriate methods. In general, the pixel selection method follows the below rules. For each group of pixels selected from the neighboring pixels, the other pixels in the same group are distributed symmetrically along the current pixel. Of course, the pixel selection method and the number of the pixels to be selected may vary.

The median calculating module 52 calculates the medians for these three groups of pixels by virtue of the median filter and three medians Φ1, Φ2 and Φ3 are obtained respectively. The reference luminance calculating module 53 calculates reference luminance Y as a function of Y=Φ2+[Φ1+Φ3−2*Φ2]*h*[1−k*var], where var=Φ3−Φ1 and h, k are two adjustable parameters for controlling denoising intensity.

The bad pixel processing module 54 determines if the pixel is a bad pixel. That is, the bad pixel processing module 54 compares the value of |cur_pixel−1| and the value of the bad pixel detection parameter "bad_pixel." If |cur_pixel−1|>bad_pixel, the current pixel (cur_pixel) is determined to be a bad pixel and let the temporary variable (tmp_data) be Φ1, i.e., tmp_data=Φ1; otherwise, the current pixel (cur_pixel) is not a bad pixel and let the temporary variable be cur_pixel, i.e., tmp_data=cur_pixel.

The edge determining module 55 determines whether the current pixel (cur_pixel) is located on the edge. That is, the edge determining module 55 compares the value of max_d and the value of edge_par, where edge_par is an adjustable parameter indicating an edge threshold. The max_d is calculated in the following way. The difference between values of two pixels which are spaced furthest apart in a horizontal direction among the selected pixels and the difference between values of two pixels which are spaced furthest apart in a vertical direction among the selected pixels are calculated. The two differences are then compared. The larger difference is denoted as "max_d". If max_d>edge_par, the current pixel is determined to be located on the edge and the edge processing module 56 is enabled for further processing; otherwise, the current pixel is determined not to be located on the edge and the non-edge processing module 57 is enabled for further processing.

The edge processing module 56 performs edge preserving for the current pixel (cur_pixel) located on the edge and limits the reference luminance Y to a range of [tmp_data−edge_limit, tmp_data+edge_limit], where a luminance adjusting parameter (edge_limit) is within a range of 0~255 and the edge processing module 56 then updates the current pixel with the limited reference luminance Y.

The non-edge processing module 57 performs a process for preventing over-denoising on the current pixel (cur_pixel). Firstly, the values of |Y−tmp_data| and avoid_over_noise are compared, where avoid_over_noise is an adjustable parameter indicating a threshold for preventing over-denoising. If |Y−tmp_data|<avoid_over_noise, the current pixel (cur_pixel) is updated with reference luminance Y; otherwise, the current pixel (cur_pixel) is updated with tmp data.

The novelty point of the present invention lies in that, during the denoising process, additional processing on the bad pixel is provided and an additional process for preventing over-denoising when the current pixel is not on the edge is provided.

The foregoing embodiments are provided to those skilled in the art for implementation or usage of the present disclosure. Various modifications or alternations may be made by those skilled in the art without departing from the spirit of the present disclosure. Therefore, the foregoing embodiments shall not be construed to be limiting to the scope of present disclosure. Rather, the scope of the present disclosure should be construed as the largest scope in accordance with inventive features as recited in the claims.

What is claimed is:

1. A method for image denoising based on median filter, comprising using a computing device to perform the operations of:

selecting three groups of pixels from neighboring pixels of a current pixel, calculating medians Φ1, Φ2 and Φ3 for the three groups of pixels, respectively;

calculating a reference luminance Y: Y=Φ2+[Φ1+Φ3−2*Φ2]*h*[1−k*var], where var=Φ3−Φ1 and h, k are two adjustable parameters for controlling denoising intensity;

determining whether the current pixel (cur_pixel) is a bad pixel; letting a temporary variable be Φ1 (tmp_data=Φ1) if the current pixel is a bad pixel; letting a temporary variable be the current pixel value (tmp_data=cur_pixel) if the current pixel is not a bad pixel;

determining whether the current pixel is located on an edge; limiting the reference luminance Y to a range of [tmp_data−edge_limit, tmp_data+edge_limit] and updating the current pixel value (cur_pixel) with the limited reference luminance Y if the current pixel is determined to be located on the edge, where edge_limit is a luminance adjusting parameter within a range of 0~255; the denoising process ends;

comparing the value of |Y−tmp_data| and the value of avoid_over_noise if the current pixel is determined not to be located on the edge, where avoid_over_noise is an adjustable parameter indicating a threshold for preventing over-denoising; updating the current pixel value with the reference luminance Y if |Y−tmp_data|<avoid_over_noise; updating the current pixel value with the temporary variable (tmp_data) if |Y−tmp_data|≧avoid_over_noise; and repeating the above steps for each pixel in the image.

2. The method for image denoising based on median filter of claim 1, wherein for any one of the groups of pixels selected from the neighboring pixels of the current pixel, the other pixels in the same group are distributed symmetrically along the current pixel.

3. The method for image denoising based on median filter of claim 1, wherein the criteria for determining whether the current pixel is a bad pixel is to compare the value of

|cur_pixel−Φ1| and the value of bad_pixel, where bad_pixel is a bad pixel detection parameter; and if |cur_pixel−Φ1|>bad_pixel, it is determined that the current pixel is a bad pixel; otherwise, it is determined that the current pixel is not a bad pixel.

4. The method for image denoising based on median filter of claim 1, wherein the criteria for determining whether the current pixel is located on the edge is to compare the value of max_d and the value of edge_par, where max_d is the larger one between a difference between values of two pixels which are spaced furthest apart in a horizontal direction among the pixels selected in the first step and a difference between values of two pixels which are spaced furthest apart in a vertical direction among the selected pixels, where edge_par is an adjustable parameter indicating an edge threshold; if max_d>edge_par, it is determined that the current pixel is located on the edge; otherwise, the current pixel is not on the edge.

5. An apparatus for image denoising based on median filter, comprising one or more computer-readable storage media, comprising:

a pixel selecting module arranged on the one or more computer-readable storage media and configured to select three groups of pixels from neighboring pixels of a current pixel (cur_pixel);

a median calculating module arranged on the one or more computer-readable storage media and configured to calculate medians Φ1, Φ2 and Φ3 for the three groups of pixels, respectively, by virtue of the median filter;

a reference luminance calculating module arranged on the one or more computer-readable storage media and configured to calculate a reference luminance Y: Y=Φ2+[Φ1+Φ3−2*Φ2]*h*[1−k*var], where var=Φ3−Φ1 and h, k are two adjustable parameters for controlling denoising intensity;

a bad pixel processing module arranged on the one or more computer-readable storage media and configured to determine whether the current pixel (cur_pixel) is a bad pixel, wherein if the current pixel is a bad pixel, let a temporary variable be Φ1 (tmp_data=Φ1); otherwise, let a temporary variable be the current pixel value (tmp_data=cur_pixel);

an edge determining module arranged on the one or more computer-readable storage media and configured to determine if the current pixel is located on the edge;

an edge processing module arranged on the one or more computer-readable storage media and configured to perform edge preserving on the current pixel (cur_pixel) located on the edge and limit the reference luminance Y to a range of [tmp_data+edge_limit, tmp_data+edge_limit], where edge_limit is a luminance adjusting parameter within a range of 0~255 and the edge processing module is further configured to update the current pixel value with the reference luminance Y; and a non-edge processing module arrange on the one more computer-readable storage media and configured to perform a process for over-denoising on the current pixel, wherein if |Y−tmp_data|<avoid_over_noise, the current pixel value is updated with the reference luminance Y; otherwise, the current pixel value is updated with tmp_data, where avoid_over_noise is an adjustable parameter indicating a threshold for preventing over-denoising.

6. The apparatus for image denoising based on median filter of claim 5, wherein for any one of the groups of pixels selected from the neighboring pixels of the current pixel, the other pixels in the same group are distributed symmetrically along the current pixel.

7. The apparatus for image denoising based on median filter of claim 5, wherein for the bad pixel processing module, the criteria for determining whether the current pixel is a bad pixel is to compare the value of |cur_pixel−Φ1| and the value of bad_pixel, where bad_pixel is a bad pixel detection parameter; and if |cur_pixel−Φ1|>bad_pixel, it is determined that the current pixel is a bad pixel; otherwise, it is determined that the current pixel is not a bad pixel.

8. The apparatus for image denoising based on median filter of claim 5, wherein the criteria adopted by the edge determining module to determine whether the current pixel is located on the edge is to compare the value of max_d and the value of edge_par, where max_d is the larger one between a difference between values of two pixels which are spaced furthest apart in a horizontal direction among the pixels selected by the pixel selecting module and a difference between values of two pixels which are spaced furthest apart in a vertical direction among the selected pixels, where edge_par is an adjustable parameter indicating an edge threshold; if max_d>edge_par, it is determined that the current pixel is located on the edge; otherwise, it is determined that the current pixel is not on the edge.

\* \* \* \* \*